(12) United States Patent
Zhang et al.

(10) Patent No.: US 11,118,569 B2
(45) Date of Patent: Sep. 14, 2021

(54) TOWER PORTION, TOWER, WIND TURBINE GENERATOR ASSEMBLY AND METHOD FOR MANUFACTURING TOWER PORTION

(71) Applicant: XINJIANG GOLDWIND SCIENCE & TECHNOLOGY CO., LTD., Xinjiang (CN)

(72) Inventors: Ziping Zhang, Beijing (CN); Xudong Cao, Beijing (CN); Jinlei Liu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 16/626,682

(22) PCT Filed: Dec. 25, 2017

(86) PCT No.: PCT/CN2017/118235
§ 371 (c)(1),
(2) Date: Dec. 26, 2019

(87) PCT Pub. No.: WO2019/061891
PCT Pub. Date: Apr. 4, 2019

(65) Prior Publication Data
US 2020/0158089 A1    May 21, 2020

(30) Foreign Application Priority Data
Sep. 30, 2017   (CN) .......................... 201710920075.5

(51) Int. Cl.
*F03D 13/20*   (2016.01)
*B23P 15/00*   (2006.01)
(Continued)

(52) U.S. Cl.
CPC .............. *F03D 13/20* (2016.05); *B23P 15/00* (2013.01); *E04H 12/085* (2013.01); *F03D 13/10* (2016.05);
(Continued)

(58) Field of Classification Search
CPC .......... F03D 13/20; F03D 13/10; F03D 13/00; B23P 15/00; E04H 13/085; F05B 2230/60; F05B 2240/912
See application file for complete search history.

(56) References Cited

U.S. PATENT DOCUMENTS 6,715,243 B1 *   4/2004   Fons ........................ E04H 7/30
                                                          220/4.12
9,850,674 B1 *  12/2017   Paura ................... E04H 12/085
(Continued)

FOREIGN PATENT DOCUMENTS

CN   201443475 U   4/2010
CN   106762444 A   5/2017
(Continued)

OTHER PUBLICATIONS

International Search Report in corresponding PCT Application No. PCT/CN2017/118235, dated Apr. 26, 2018, pages.
(Continued)

*Primary Examiner* — Theodore V Adamos
(74) *Attorney, Agent, or Firm* — Bayes PLLC

(57) ABSTRACT

A tower portion, a tower, and a wind turbine generator assembly are provided. The tower portion includes: a main tower portion, and a longitudinal flange pair. The main tower portion is divided into at least two sections by means a longitudinal seam formed in a longitudinal direction thereof. The longitudinal flange pair is provided in the longitudinal seam along the longitudinal direction of the main tower portion. The longitudinal flange pair protrudes from an inner
(Continued)

surface and an outer surface of the main tower portion in a radial direction thereof, and is welded to a corresponding section of the main tower portion. The tower portion reduces welding difficulty, reduces heat produced during the welding process, and improves the quality of the weld. The application further discloses a method for manufacturing the tower portion.

6 Claims, 10 Drawing Sheets

(51) Int. Cl.
*F03D 13/10* (2016.01)
*E04H 12/08* (2006.01)

(52) U.S. Cl.
CPC ..... *F05B 2230/60* (2013.01); *F05B 2240/912* (2013.01)

(56) References Cited

U.S. PATENT DOCUMENTS

| | | | | |
|---|---|---|---|---|
| 2006/0272244 | A1* | 12/2006 | Jensen | F03D 13/20 52/223.5 |
| 2011/0283652 | A1* | 11/2011 | Haridasu | F03D 13/20 52/651.01 |
| 2012/0248281 | A1* | 10/2012 | Bennett | H01Q 1/1242 248/524 |
| 2017/0037830 | A1* | 2/2017 | Nielsen | F03D 13/20 |
| 2017/0122292 | A1* | 5/2017 | Michel | B23D 45/006 |
| 2018/0179777 | A1* | 6/2018 | Tuerk | E04H 12/34 |
| 2019/0003199 | A1* | 1/2019 | Porm | E04H 12/342 |

FOREIGN PATENT DOCUMENTS

| | | |
|---|---|---|
| CN | 206158924 U | 5/2017 |
| CN | 206158925 U | 5/2017 |
| CN | 206206090 U | 5/2017 |
| DE | 102013107059 A1 | 1/2015 |
| EP | 3134644 A1 | 3/2017 |
| WO | 2015/161858 A1 | 10/2015 |

OTHER PUBLICATIONS

Supplementary European Search Report issued in corresponding European Application No. EP 17927093.9-1007, dated Oct. 9, 2020, 6 pages.

* cited by examiner

TOWER PORTION, TOWER, WIND TURBINE GENERATOR ASSEMBLY AND METHOD FOR MANUFACTURING TOWER PORTION

RELATED APPLICATIONS

The present application is a U.S. national phase of International Application No. PCT/CN2017/118235, titled "TOWER PORTION, TOWER, WIND TURBINE GENERATOR ASSEMBLY AND METHOD FOR MANUFACTURING TOWER PORTION," filed on Dec. 25, 2017, which claims the priority to Chinese patent application No. 201710920075.5 titled "TOWER SECTION, TOWER, WIND TURBINE AND METHOD FOR MANUFACTURING TOWER SECTION," filed with the China National Intellectual Property Administration on Sep. 30, 2017, both of which are incorporated herein by reference in their entireties.

FIELD

The present application relates to the technical field of wind power generation, and more specifically, to a tower section for manufacturing a tower of a wind turbine, a tower manufactured by using the tower section, a wind turbine including the tower, and a method for manufacturing the tower section.

BACKGROUND

A tower in a wind turbine is a component for weight-bearing, pressure-bearing and load-bearing, and a structure of the tower directly affects the working reliability of the wind turbine. A cylindrical tower is a commonly used tower structure. Due to its huge structure, the cylindrical tower is generally formed by connecting multiple tower sections in a longitudinal direction, and each of the multiple tower sections is divided into multiple parts in a circumferential direction to facilitate transportation. FIG. 1A shows the welding and dividing methods of conventional tower sections.

In the conventional tower sections shown in FIG. 1A, a plate-shaped material is first rolled round, and then welded at a butt joint to form a butt welding seam 3', thereby forming a cylinder section member 1'. Then, multiple cylinder section members 1' are sequentially connected in the longitudinal direction. When the multiple cylinder section members 1' are connected in the longitudinal direction, the butt welding seams 3' of the multiple cylinder section members 1' are staggered by a certain angle along the circumferential direction so as to be staggered in the longitudinal direction. In this way, T-shaped joints are formed. In order to ensure the welding quality of the T-shaped joints, requirements for the welding process need to be strict.

In addition, when dividing the above tower, a dividing cut portion 6' is required to avoid the butt welding seam 3'. Since a cutting slit of the dividing cut portion 6' is smaller, that is, a width of the cutting slit is smaller than the width of the butt welding seam 3', the butt welding seam 3' cannot be completely removed. Therefore, it is necessary to perform penetration welding on the butt welding seam 3' to ensure the welding quality.

In summary, in order to control the quality, currently, 100% RT (radiographic testing) flaw detection is generally performed for T-shaped joints; for the penetration welding, the welding seams are required to reach Class I under 100% UT (ultrasonic testing) flaw detection. These inspections cause a large amount of work. Moreover, radiographic testing does a great harm to the workers, and restrictions of production are strict.

In addition, in the conventional technology, when the divided tower are assembled, two vertical flanges 8' are fixed to an inside of a cylinder wall by welding at the dividing cut portion 6', as shown in FIG. 1B. Therefore, a space between the two vertical flanges 8' is small, resulting in inconvenient welding.

SUMMARY

An object of the present application is to provide a tower section, a tower, a wind turbine, and a method for manufacturing the tower section, which do not need UT flaw detection or RT flaw detection for butt slits of cylinder section members and reduce UT flaw detection.

Another object of the present application is to provide a tower section, a tower, and a method of manufacturing the tower section and the tower, which reduce a large amount of welding work.

According to an aspect of the present application, a method for manufacturing a tower section is provided, which includes the following steps: (a) connecting multiple cylinder section members in sequence in a longitudinal direction to form a tower section body; (c) cutting the tower section body to form at least two longitudinal slits along a longitudinal direction of the tower section body to divide the tower section body into at least two section parts; and (d) providing longitudinal flange pairs is in the longitudinal slits, where each of the longitudinal flange pairs protrudes from an inner surface and an outer surface of the tower section body along a radial direction of the tower section body, respectively.

Each of the cylinder section members has a longitudinal butt slit, and in step (a), the longitudinal butt slits of the multiple cylinder section members are arranged at positions corresponding to at least one of the longitudinal slits.

The method further includes step (b): connecting circumferential flanges at two ends of the tower section body in the longitudinal direction, after the tower section body is formed by the step (a).

In step (c), the butt slits are cut off by cutting the longitudinal slits.

Each of the circumferential flanges is annular and is formed by splicing at least two arc-shaped flanges, and splicing seams are formed between every two adjacent arc-shaped flanges, respectively. The step (b) further includes: aligning each of the splicing seams with the corresponding longitudinal slit in the longitudinal direction.

The step (c) includes: fixedly connecting inner wall support members to the section parts on two sides of each of the longitudinal slits along with a movement of a cutting position, when cutting the longitudinal slits; or fixing the inner wall support members to the section parts on two sides of each of the longitudinal slits before cutting the longitudinal slits, and then cutting the longitudinal slits from outside.

The method further includes step (e): welding is performed at a joint of each of the longitudinal flanges and the tower section body.

The step (a) further includes: rolling a plate-shaped material to form the cylinder section member; and intermittently or continuously welding two butt sides of the plate-shaped material to form the butt slit.

According to another aspect of the exemplary embodiments of the present application, a tower section is provided, which includes: a tower section body, which is divided into at least two section parts by a longitudinal slit formed in the longitudinal direction; and longitudinal flange pairs, which are provided in the longitudinal slit in the longitudinal direction, and protrude from an inner surface and an outer surface of the tower section body in a radial direction, and are welded to corresponding section parts.

The tower section body includes multiple cylinder section members connected head to end, the longitudinal butt slit is formed on each of the multiple cylinder section members, and the longitudinal slit is formed at the longitudinal butt slit and configured to cut off the longitudinal butt slit.

The tower section further includes circumferential flanges connected to two ends of the tower section body, each of the circumferential flanges is formed by splicing at least two arc-shaped flanges, splicing seams are formed between every two adjacent arc-shaped flanges, respectively, and each of the splicing seams is aligned with the corresponding longitudinal slit in the longitudinal direction.

Each of the longitudinal flange pairs includes a pair of longitudinal flanges, and each of the longitudinal flanges is fixedly connected to the corresponding section part by double-sided fillet welding.

According to another aspect of the present application, a tower is provided, which is formed by connecting the multiple tower sections to each other in the longitudinal direction.

According to another aspect of the present application, a wind turbine having the above tower is provided. According to the method for manufacturing the above tower section, since the butt slits of the cylinder section members are all cut off after forming the longitudinal slits, only simple tack welding is required at the butt slits when manufacturing the cylinder section members, thereby reducing a large amount of working of penetration welding. Moreover, it is not necessary to perform flaw detection on the butt slits of the cylinder section members, thereby saving costs and working hours.

BRIEF DESCRIPTION OF THE DRAWINGS

The above and other objects, features, and advantages of the present application will become more apparent through the detail description in conjunction with the drawing of the exemplary embodiments.

DETAILED DESCRIPTION OF THE EMBODIMENTS

The following detailed description is provided to assist the reader in acquiring a comprehensive understanding of the methods and equipment described herein. However, various changes, modifications, and equivalents of the methods, equipment described herein will be apparent to those skilled in the art. In addition, descriptions of functions and structures well-known to those skilled in the art may be omitted for clarity and conciseness.

The features described herein may be implemented in different ways and will not be construed as being limited to the examples described herein. More specifically, the examples described and provided herein make the present application thorough and complete, and convey the full scope of the present application to those skilled in the art.

Figure 1A:
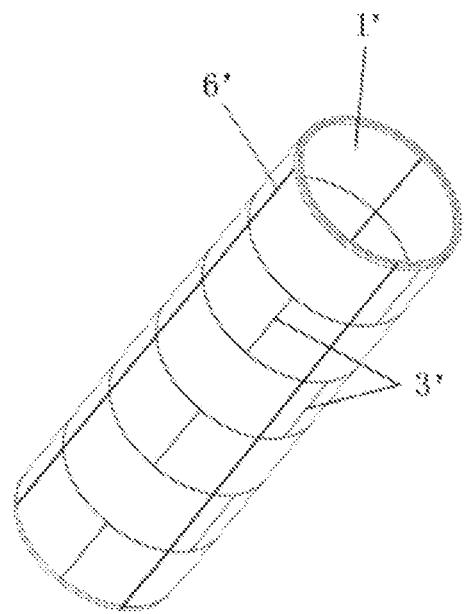
FIG. 1A is a schematic view of a conventional tower section.
Figure 1B:
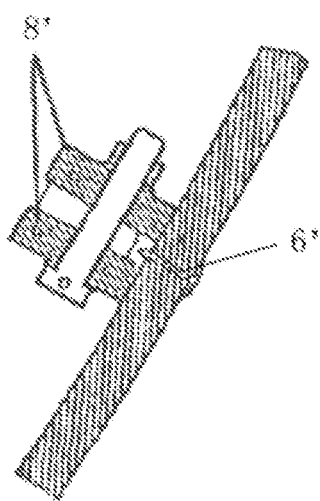
FIG. 1B is schematic sectional view of a longitudinal flange in the conventional tower section.
Figure 2:
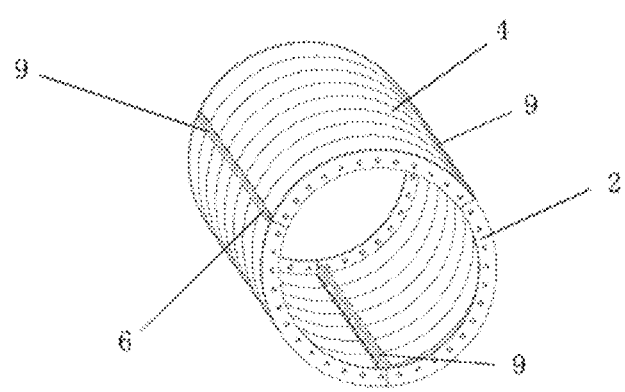
FIG. 2 is a perspective view of a tower section according to an exemplary embodiment of the present application.

FIG. 2 shows a tower section according to an exemplary embodiment of the present application. The tower section is composed of a tower section body 4, longitudinal flange pairs 9, and two circumferential flanges 2. The tower section body 4 may be cylindrical or conical cylinder shaped. A cylinder wall of the tower section body 4 is divided into two or more section parts by longitudinal slits 6 extending along a longitudinal direction of the tower section body 4. In other words, the longitudinal slits 6 penetrate the cylinder wall of the tower section body 4, so that the tower section body 4 is divided into two or more section parts. The longitudinal flange pairs 9 are provided in the longitudinal slits 6. The two circumferential flanges 2 are fixedly connected to axial ends of the tower section body 4, respectively.

As shown in FIGS. 5A to 5D, the tower section body 4 according to the present application is formed by multiple cylinder section members 1 connected head to end in sequence. Each of the cylinder section members 1 is formed by rolling a plate-shaped material round, so a longitudinal butt slit 3 is formed on each of the cylinder section members 1. According to the solution of the present application, the butt slit 3 is arranged at a position where the longitudinal slit 6 is to be formed, so that when the longitudinal slit 6 is cut, the butt slit 3 can be completely cut off. Therefore, there is no butt slit 3 on the formed tower section, so that the tower assembled by the tower section bodies 4 does not include the T-shaped joints mentioned in the background technology, which saves the subsequent radiographic testing process. This will be described in detail later with reference to FIGS. 6A to 6H.

Figure 3:
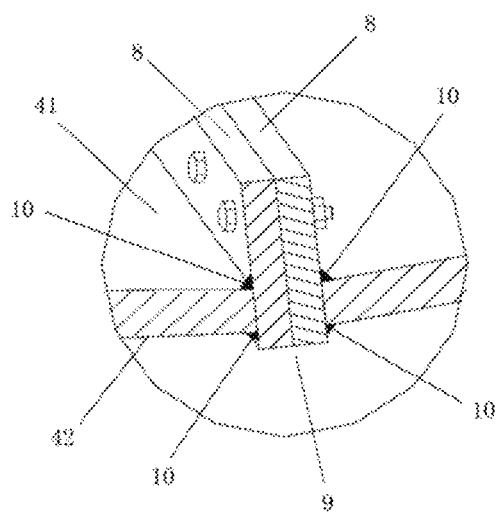
FIG. 3 is a partially enlarged view of a longitudinal flange of the tower section according to an exemplary embodiment of the present application.

FIG. 3 is a partially enlarged view of the longitudinal flange pair 9 arranged in the longitudinal slit 6. As shown in FIG. 3, the longitudinal flange pair 9 includes two longitudinal flanges 8 arranged in parallel, and an outer side of each longitudinal flange 8 is fixedly connected to a circumferential cutting surface of the corresponding section part. Each of the longitudinal flanges 8 is provided with multiple through holes for bolt interconnection. By connecting the pair of longitudinal flanges 8 to each other, adjacent section parts can be connected together. The longitudinal flange pairs 9 are arranged in the longitudinal slits 6 in the longitudinal direction, and protrude from an inner surface 41 and an outer surface 42 of the tower section body 4 in a radial direction. Circumferential end portions of the section parts adjacent to the longitudinal flanges 8 are welded to side surfaces of the longitudinal flanges 8 to form multiple fillet welds 10.

Figure 4:
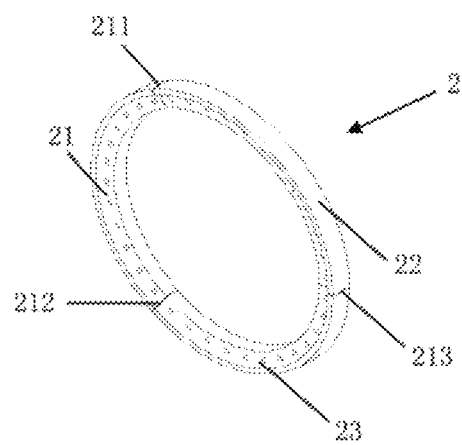
FIG. 4 is a perspective view of a circumferential flange of the tower section according to an exemplary embodiment of the present application.

The circumferential flanges 2 are annular, and one circumferential flange is provided at each of the two ends of the tower section body 4. The multiple tower sections can be assembled into a tower by connecting the circumferential flanges 2 of the multiple tower sections to each other through bolts. Each of the circumferential flanges 2 is formed by splicing at least two arc-shaped flanges. FIG. 4 shows a perspective view of the circumferential flange 2 according to an exemplary embodiment of the present application. In the embodiment shown in FIG. 4, the circumferential flange 2 is formed by splicing three arc-shaped flanges 21, 22, and 23, and splicing seams 211, 212, and 213 are formed between every two adjacent arc-shaped flanges, respectively.

When the circumferential flanges 2 are connected, the splicing seams of the circumferential flanges 2 are aligned with the butt slits 3 of the cylinder section members of the tower section in the longitudinal direction. Here, although the tower section body 4 is formed by connecting the cylinder section members having the butt slits 3 in the longitudinal direction, the tower section manufactured according to the manufacturing method of the exemplary embodiment of the present application has only the longitudinal slits 6 and the longitudinal flange pairs 9 arranged in the longitudinal slits, and does not reserve the butt slits 3. Therefore, there is no T-shape joint on the tower section or the whole tower, which saves the subsequent radiographic inspection process.

Next, the method for manufacturing the tower section according to the present application will be described in detail with reference to FIGS. 5A to 5D and FIGS. 6A to 6H.

Figure 5A:
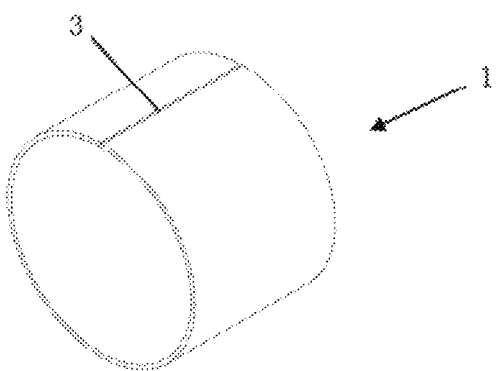
FIG. 5A is a perspective view of a cylinder section member constituting the tower section according to an exemplary embodiment of the present application.

First, the tower section body 4 is formed. FIG. 5A shows the cylinder section member 1 for assembling the tower section body 4 according to the present application. As shown in FIG. 5A, the single cylinder section member 1 is formed by rolling the plate-shaped material as the cylinder wall. Two butt sides of the plate-shaped material are joined to form the butt slit 3. Intermittent welding or continuous welding may be performed at the butt slit 3, so as to ensure that the butt slit of the cylinder section member 1 is well positioned. After the welding is completed, the cylinder section member 1 may be deformed, causing the roundness to fail to meet the requirements; in this case, the cylinder section member 1 is required to be re-rolled to ensure the roundness thereof, which is called rerolling. Then, multiple cylinder section members 1 are connected head to end to form the tower section body 4 with a predetermined length. Generally, the multiple cylinder section members 1 are connected together by welding. When the multiple cylinder section members 1 are connected head to end, each butt slit 3 is located at a position where the respective cutting slit 6 is to be formed.

Figure 5B:
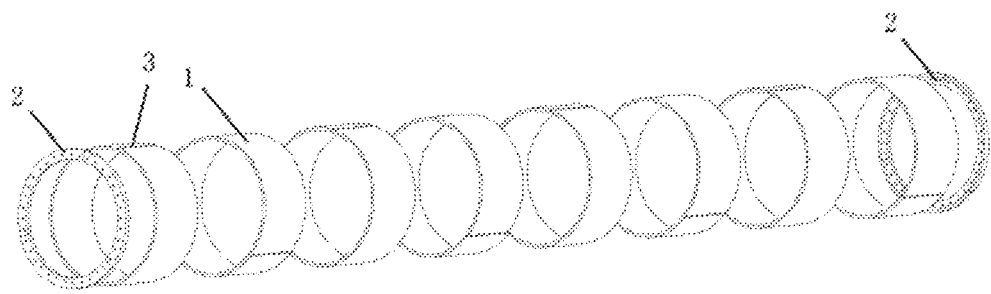
FIG. 5B is a schematic exploded view of the tower section before being longitudinally cut according to an exemplary embodiment of the present application.
Figure 5C:
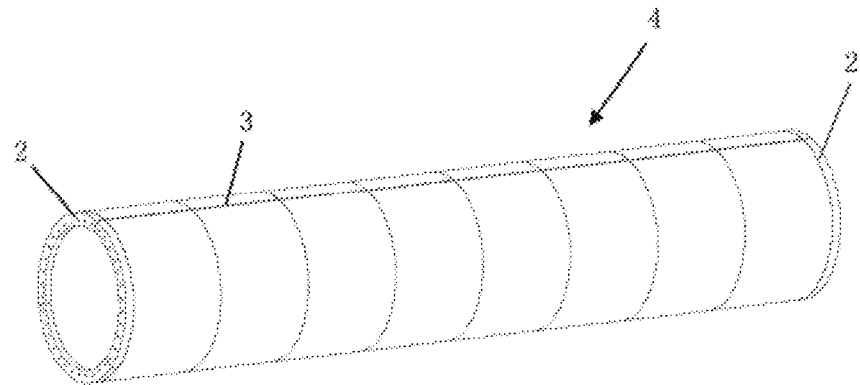
FIGS. 5C and 5D are perspective views of the tower section before being longitudinally cut according to an exemplary embodiment of the present application.
Figure 5D:
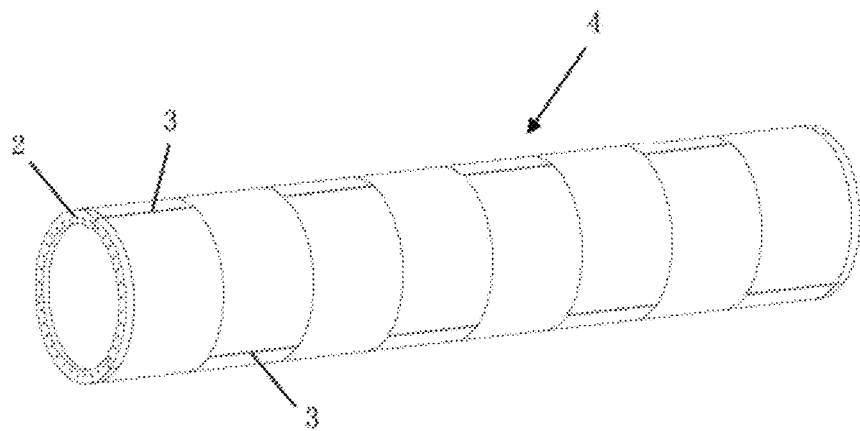

Next, one circumferential flange 2 is provided at each of the two ends of the tower section body 4. FIG. 4 shows the circumferential flanges 2 provided at two ends of the tower section body 4. The circumferential flanges 2 are connectors configured to securely connect multiple tower sections 4. On each of the circumferential flanges 2, multiple longitudinal through holes are provided in the circumferential direction to receive bolts for fastening the connection. The circumferential flange 2 is annular in a whole. The circumferential flange is cut into sections, for example, cut into three arc-shaped flanges 21, 22, and 23 as shown in FIG. 4, and then the sections are spliced into the circumferential flange by tooling. Therefore, splicing seams 211, 221, 231 are left on the circumferential flange 2. It should be noted that, the number of sections is not limited to this, which may be two or four more sections. Preferably, the number and positions of the sections are in correspondence with the number and positions of the longitudinal slits 6 to be formed on the tower section body 4. For example, in a case that the tower section body 4 is to be divided into three section parts and the longitudinal slits 6 are distributed along three longitudinal lines on the tower section body 4, the circumferential flange 2 is also preferably divided into three arc-shaped sections corresponding to the positions of the three longitudinal lines. FIG. 5B shows an exploded view of the tower section before cutting and dividing. FIGS. 5C and 5D show perspective views of the tower section before cutting and dividing. As shown in FIGS. 5B to 5D, the multiple cylinder section members 1 are aligned and welded in the longitudinal direction, and the two circumferential flanges 2 are respectively arranged at two ends of the multiple cylinder section members 1 after welding, and are fixed by welding, thereby forming the tower section body 4.

When the multiple cylinder section members 1 are sequentially connected, the butt slits 3 of the cylinder section members 1 are aligned in the longitudinal direction as shown in FIG. 5C, so that all the butt slits 3 are located on one straight line. Alternatively, as shown in FIG. 5D, the butt slits 3 are staggered in the longitudinal direction, but each butt slit 3 is required to be on a same straight line as the corresponding longitudinal slit 6 to be formed by cutting later, so that when the longitudinal slits 6 are cut off, all the butt slits 3 are cut off, and there is no T-shaped joint on the tower section or the whole tower, which thereby saves the subsequent radiographic testing process. In other words, if the tower section body 4 is intended to be cut into three section parts in the longitudinal direction, three longitudinal slits 6 are required to be formed by cutting the tower section body 4, and each butt slit 3 may be arranged in the circumferential direction at a position corresponding to at least one of the three longitudinal slits 6. All the butt slits 3 may be aligned along one straight line, or the butt slits may be respectively arranged on two or three straight lines corresponding to the longitudinal slits 6. In summary, it will be acceptable as long as the butt slits 3 are arranged at positions where the longitudinal slits 6 are to be formed. Then, the circumferential flanges 2 are welded to the tower section body 4, and each of the splicing seams of the circumferential flanges 2 is aligned with the corresponding longitudinal slit 6.

Figure 6A:
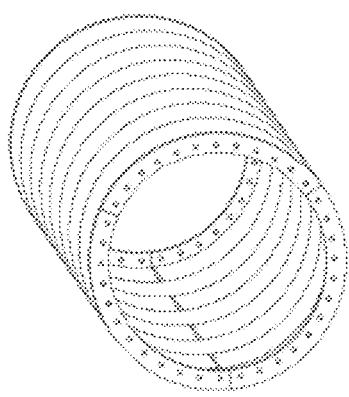
FIGS. 6A to 6H are process views of a method for manufacturing a tower section according to an exemplary embodiment of the present application.
Figure 6B:
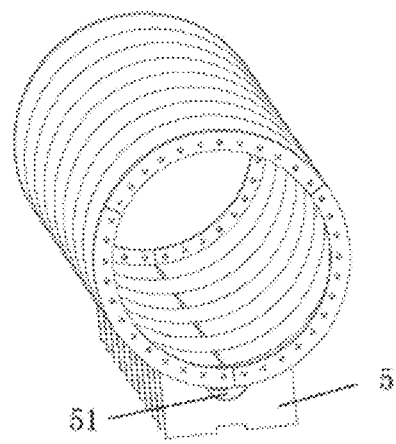
Figure 6C:
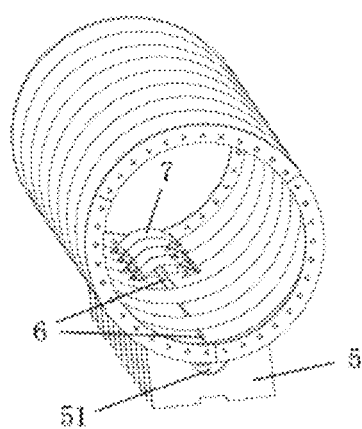
Figure 6D:
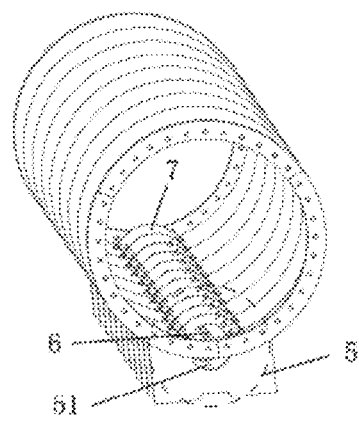
Figure 7:
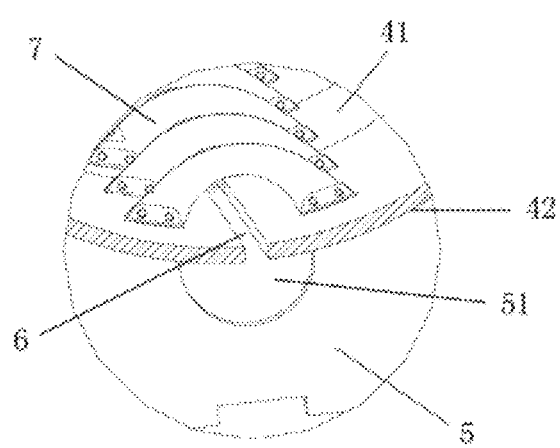
FIG. 7 is a partially enlarged view of the dotted circle portion in FIG. 6D.

Next, one longitudinal slit 6 is formed by cutting the tower section body 4. When cutting, a first longitudinal position is cut along a splicing seam of the circumferential flange 2. Specifically, as shown in FIG. 6A, the orientation of the tower section to be cut is adjusted to allow the position to be cut faces downward. As shown in FIG. 6B, bottom support members 5 are arranged at intervals along the longitudinal direction of the tower section body 4 to ensure that an outer wall of the tower section body 4 is supported by the bottom support members 5, thereby reducing the deformation of the tower section body 4 caused by the weight of the tower section. One or more bottom support members 5 may be provided, but it is preferred that the bottom support members are distributed throughout the tower section body 4 in the longitudinal direction, and an auxiliary space 51 is provided. The auxiliary space 51 is located directly below the position to be cut, so that the position to be cut is suspended for cutting. Then, as shown in FIG. 6C, the tower section body 4 is cut with a flame to form the longitudinal slit 6 that penetrates through the tower section body 4 in the longitudinal direction. In order to ensure that the width of each longitudinal slit is uniform, it is preferable to use two flames to cut at the same time, and a cutting machine is placed inside the tower section body 4. During the cutting process, inner wall support members 7 may be provided one by one following the movement of a cutting position, to connect and fix the section parts located on two sides of the longitudinal slit 6, so that relative positions of the section parts located on two sides of the longitudinal slit 6 are fixed. In this way, it can be ensured that the tower section body 4 is not affected by its own weight when cutting to avoid being dislocated or deformed. Alternatively, the inner wall support members 7 may be well placed before cutting the longitudinal slit 6, and then the longitudinal slit 6 is cut from the outside, such that the bottom support members 5 can be saved and the process can be reduced. After the cutting is completed, as shown in FIG. 6D, the cut-off portions are removed, and the longitudinal slit 6 is polished. In order to cut off the butt slits 3, it is preferred that the width of the longitudinal slit 6 is equal to or larger than the width of each butt slit 3. FIG. 7 is an enlarged view of the dotted circle portion in FIG. 6D, in which the circumferential flange 2 is omitted in order to show the longitudinal slit 6 more clearly.

Figures 6E, 6F:
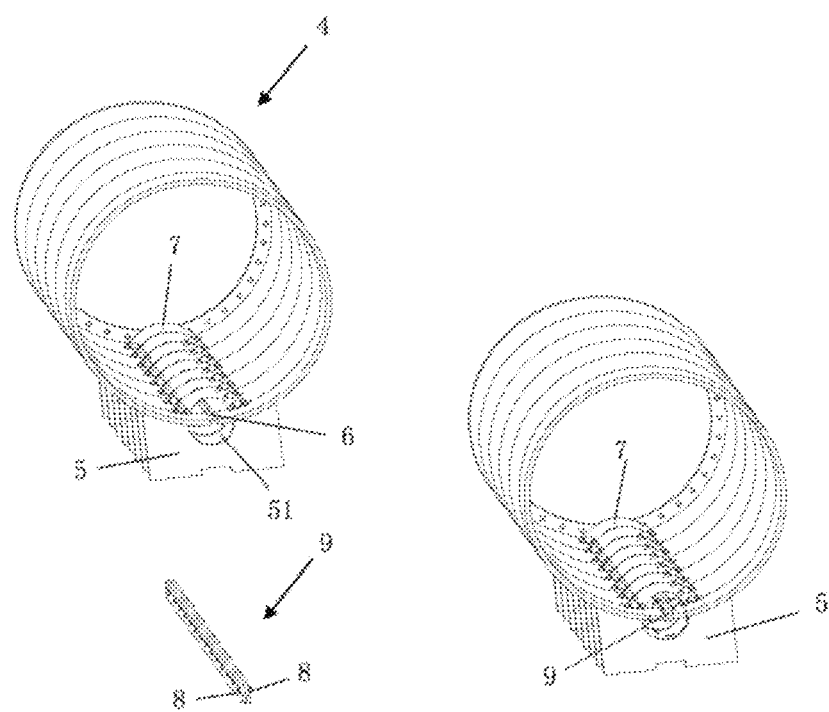

Next, the longitudinal flange pair 9 is arranged in the longitudinal slit 6. As shown in FIG. 6E, first, two longitudinal flanges 8 having multiple bolt-passing holes are positioned with bolts and paired to form the longitudinal flange pair 9. Then, as shown in FIG. 6F, the longitudinal flange pair 9 is placed in the longitudinal slit 6 in the longitudinal direction. In order to clearly show the longitudinal slit 6 and the longitudinal flange pair 9, the circumferential flange 2 is omitted in FIGS. 6E and 6F. The longitudinal flange pair 9 may be inserted into the auxiliary space 51 from a position below the tower section body 4 in the longitudinal direction, and then inserted upward into the longitudinal slot 6. The longitudinal flange pair 9 protrudes from the inner surface 41 and the outer surface 42 of the tower section body 4, so that each longitudinal flange 8 forms a T-shaped section with the cylinder wall. In this way, as shown in FIG. 3, the longitudinal flange pair 9 forms fillet welds 10 on the inside and outside of the cylinder wall. The advantages of the fillet welds 10 are that the fillet welds can reduce the difficulty of construction and reduce the heat generated during the welding process, and a residual stress after the welding is completed is low, which makes the flanges difficult to deform. Then, two outer sides of the longitudinal flange pair 9 are respectively welded with the cylinder walls on two sides at the longitudinal slit 6 to complete the assembling of the longitudinal flange pair 9. During the welding of the longitudinal flange pair 9, the longitudinal flange pair 9 may be positioned first by intermittent welding or continuous welding, and then the inner wall support members 7 and the bottom support members 5 are removed, and then the longitudinal flange pair 9 is completely welded.

Figure 6G:
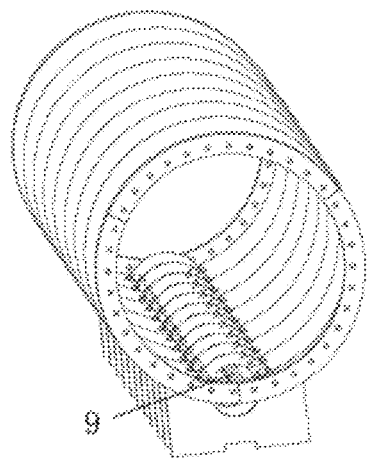
Figure 6H:
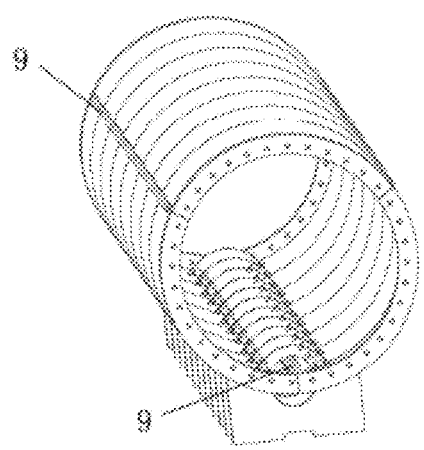

After completing the above work, the tower section body 4 is rotated, so that a next position to be cut is placed directly above the auxiliary space 51, and then the processes shown in FIGS. 6A to 6F are repeated until all processes are completed. FIG. 6G shows a perspective view of the tower section after the assembling of one longitudinal flange pair 9 at one longitudinal slit. FIG. 6H shows a perspective view of the tower section after the assembling of three longitudinal flange pairs 9. When the longitudinal slit 6 is cut, all the butt slits 3 formed on the multiple cylinder section members 1 are all cut off. Therefore, there is no T-shaped weld or butt slit on the completed tower section. In order to completely cut off the butt slit 3, the width of the longitudinal slit 6 is equal to or larger than the width of the butt slit 3.

For the tower section manufactured according to the above method, since the butt slits 3 formed on the cylinder section members 1 are completely cut off in the subsequent process, only simple tack welding is required at the butt slits 3 when manufacturing the cylinder section members 1, as long as the round recovering can be achieved, thereby reducing a large amount of working of penetration welding. In addition, since the butt slits 3 are cut off by the longitudinal slits 6, there are no T-shaped joints on the tower section or the whole tower. Therefore, only the quality of circumferential welds of adjacent cylinder section members are required to be controlled, while there is no need to perform UT flaw detection or RT flow detection for the butt slits of the cylinder section members 1, thereby saving costs and working hours. In addition, if the longitudinal flange pairs 9 are aligned with the outer wall of the tower section body, penetration welding is required, grooves are required to be provided on the cylinder wall, and a large amount of heat generated by the penetration welding will cause large deformation during welding. According to the tower section and the method for manufacturing the tower section of the present application, the longitudinal flange pairs 9 protrude from the inner surface 41 and the outer surface 42 of the tower section body 4, and each of the longitudinal flanges 8 forms a T-shaped section with the cylinder wall in the circumferential direction of the tower, such that it is convenient for welding with fillet welds, a construction space is large, the construction is convenient, and the welding quality is easy to control.

Although the present application describes the tower section and the manufacturing method thereof with manufacturing a tower of a wind turbine as an example, the present application is not limited to the technical field of wind power generation, and can also be applied to various occasions where a tower is required to be manufactured.

Although the present application has been represented and described with reference to the exemplary embodiments, it should be understood by those skilled in the art that, various modifications and variations may be made to the embodiments without departing from the spirit and the scope of the present application defined by the claims.

The invention claimed is:

1. A method for manufacturing a tower section, comprising the following steps:
    connecting a plurality of cylinder section members in sequence in a longitudinal direction to form a tower section body;
    cutting the tower section body to form at least two longitudinal slits along a longitudinal direction of the tower section body to divide the tower section body into at least two section parts; and
    providing longitudinal flange pairs in the longitudinal slits, wherein each longitudinal flange of the longitudinal flange pairs protrudes from both an inner surface and an outer surface of the tower section body along a radial direction of the tower section body,
    wherein each of the cylinder section members has a longitudinal butt slit, and in the connecting the plurality of cylinder section members, the longitudinal butt slits of the plurality of cylinder section members are arranged at positions corresponding to at least one of the longitudinal slits, wherein the cutting the tower section body step further comprises:

fixedly connecting inner wall support members to the section parts on two sides of each of the longitudinal slits along with a movement of a cutting position, when cutting the longitudinal slits; or fixing the inner wall support members to the section parts on two sides of each of the longitudinal slits before cutting the longitudinal slits, and then cutting the longitudinal slits from outside.

2. The method according to claim 1, further comprising: connecting circumferential flanges at two ends of the tower section body in the longitudinal direction, after the tower section body is formed by the connecting the plurality of cylinder section members.

3. The method according to claim 2, wherein
each of the circumferential flanges is annular and is formed by splicing at least two arc-shaped flanges, and splicing seams are formed between every two adjacent arc-shaped flanges, respectively; and the connecting circumferential flanges further comprises: aligning each of the splicing seams with the corresponding longitudinal slit in the longitudinal direction.

4. The method according to claim 1, wherein, in the cutting the tower section body, the butt slits are cut off by cutting the longitudinal slits.

5. The method according to claim 1, further comprising: welding at a joint of each of the longitudinal flanges and the tower section body.

6. The method according to claim 1, wherein the connecting the plurality of cylinder section members further comprises: rolling a plate-shaped material to form the cylinder section member; and intermittently or continuously welding two butt sides of the plate-shaped material to form the butt slit.

* * * * *